United States Patent Office 2,708,093
Patented May 10, 1955

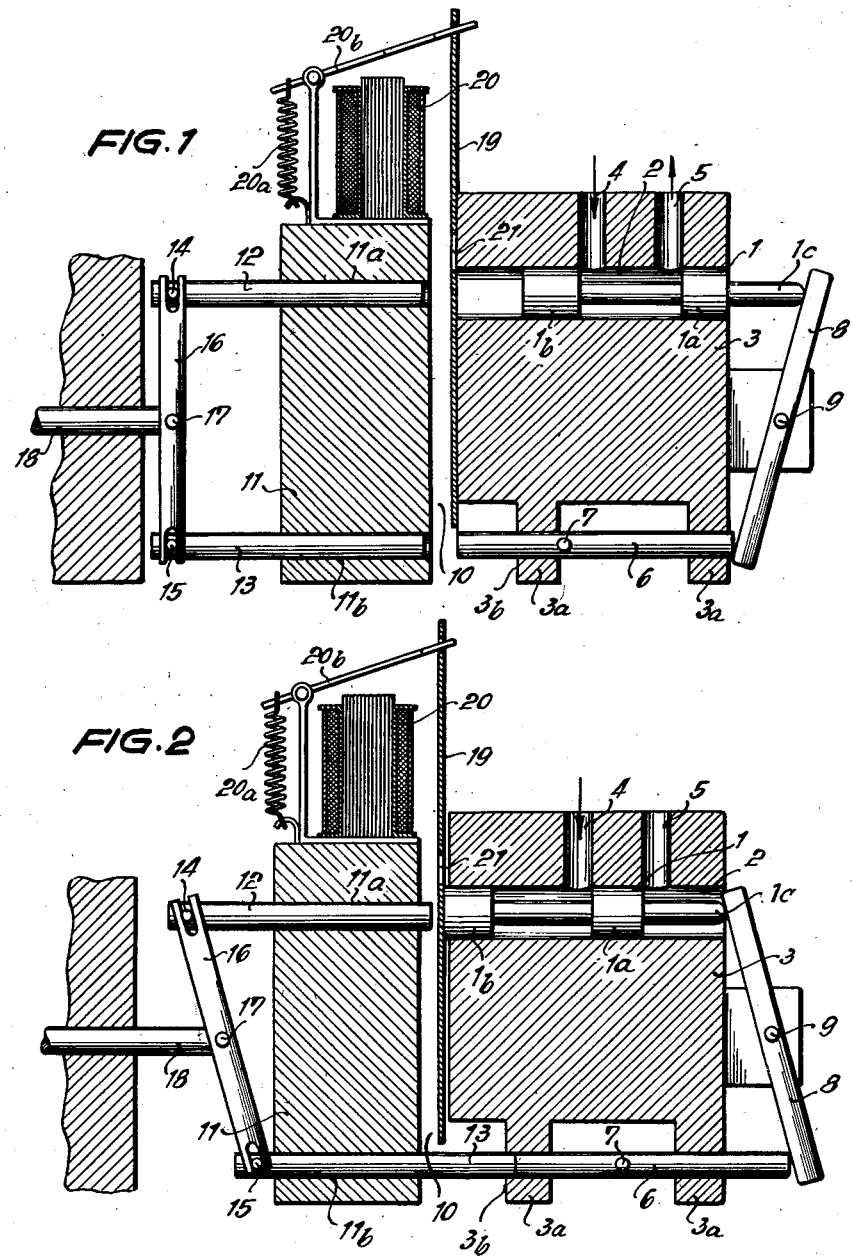

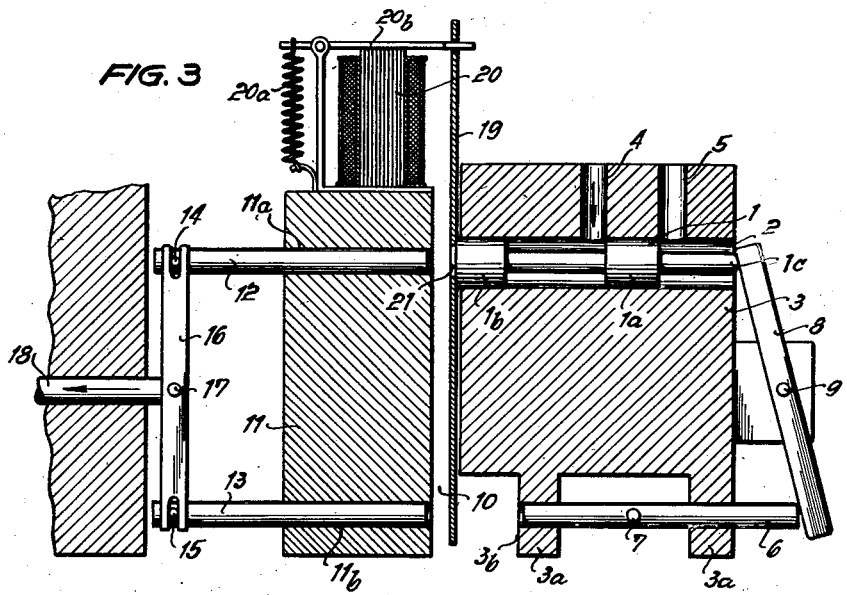
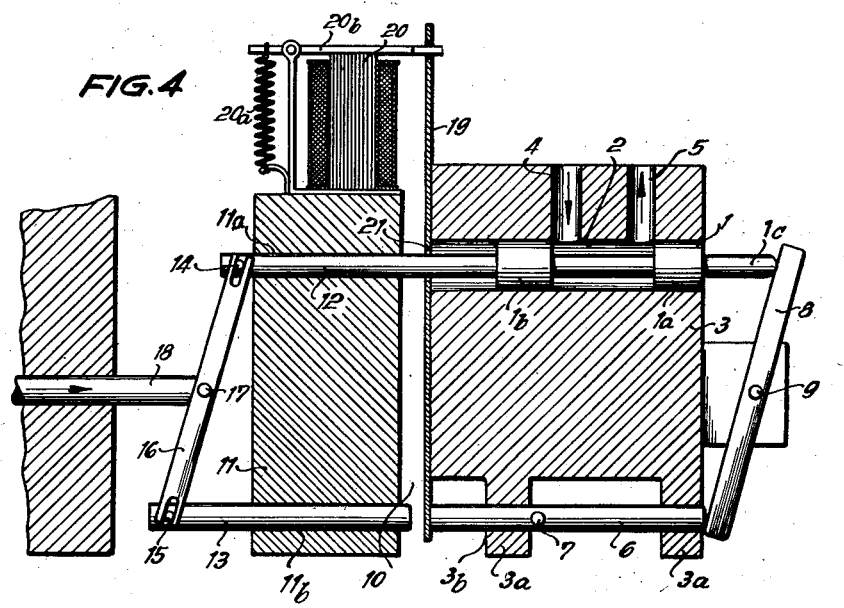
INVENTOR
FELIX LEBER
BY:

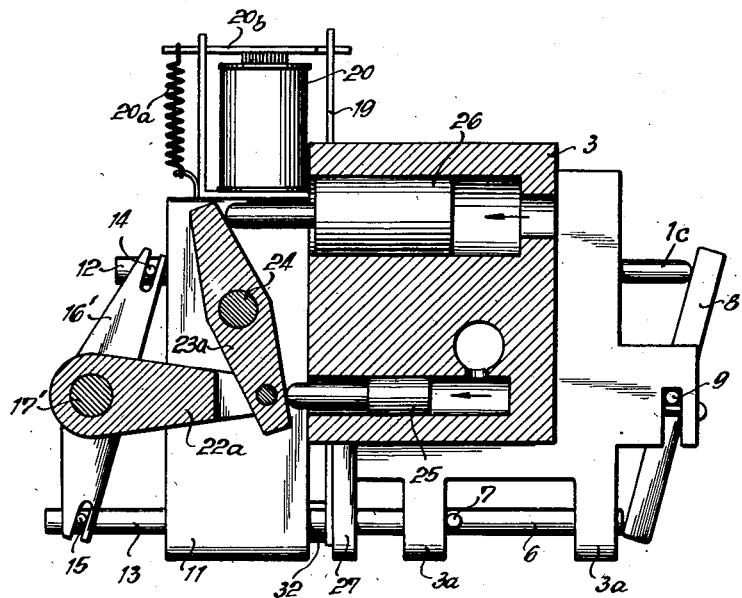

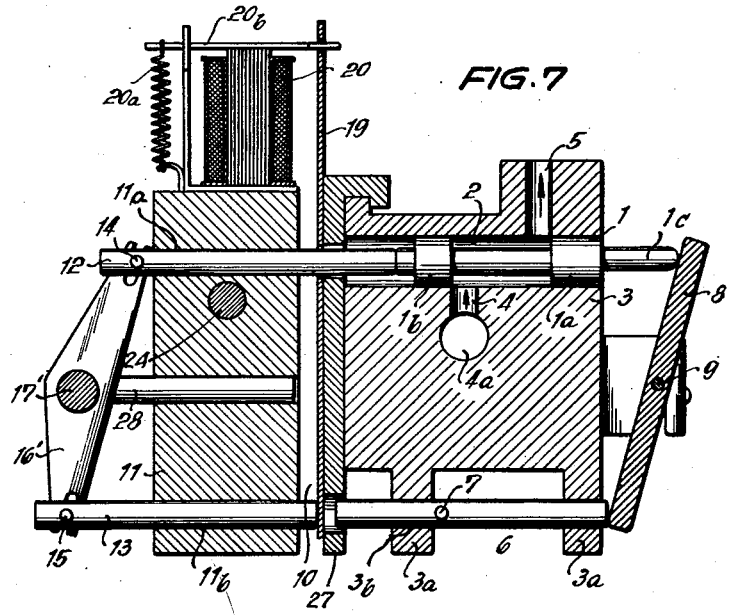
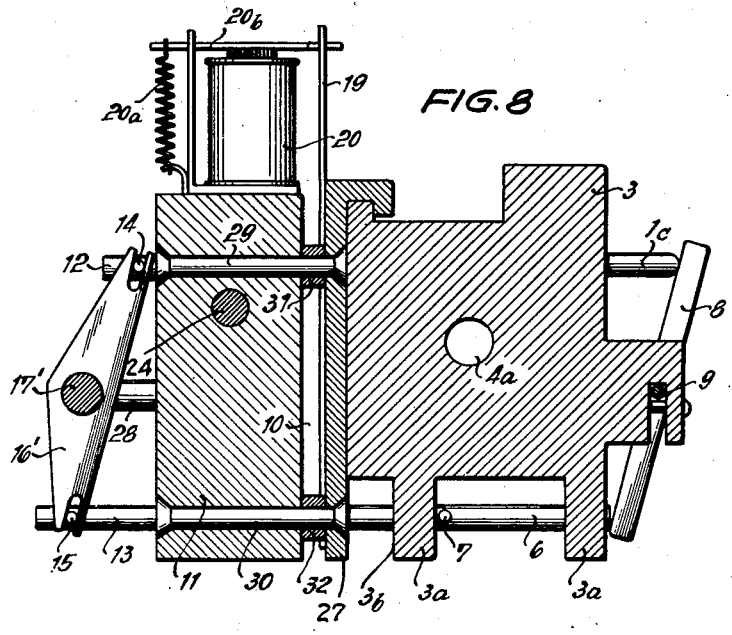

2,708,093

VALVE OPERATING MEANS WITH ELECTRO-
MAGNETIC BLOCKING MEANS

Felix Leber, Koln-Riehl, Germany

Application December 18, 1953, Serial No. 399,118

Claims priority, application Germany December 22, 1952

16 Claims. (Cl. 251—58)

The present invention relates to a valve control arrangement, and more particularly to a control arrangement for a valve controlling the flow of an operating liquid to the hydraulic drive of a movable member of a machine.

It is one object of the present invention to provide a valve control arrangement in which a valve is moved between two control positions by means which push the valve for shifting it, and which exerts no pressure on the valve while the valve is in one of the control positions.

It is another object of the present invention to shift the valve by two motion transmitting means, and to provide independent blocking means alternately blocking one of the motion transmitting means while the other motion transmitting means is free to shift the valve.

It is a further object of the present invention to provide a valve control arrangement in which the motion transmitting means for shifting the valve may be operated with great force, while the blocking means requires only a small force for operation.

It is a still further object of the present invention to provide a reciprocating drive member actuating the motion transmitting means only during movement in one direction.

It is yet another object of the present invention to shift the blocking means while the blocking means and the motion transmitting means are out of engagement so that the blocking means may be easily shifted.

With these objects in view, the present invention mainly consists in a valve control arrangement, comprising, in combination, a conduit member formed with a conduit, a control valve means located in the conduit and being movable between a conduit closing control position and a conduit opening control position; a drive member movable between an operative position and an inoperative position, first motion transmitting means connected to the drive member for movement therewith and tending to engage the control valve means during movement of the drive member from the inoperative position to the operative position for moving the control valve into one of the control positions, second motion transmitting means connected to the drive member for movement therewith and tending to engage the control valve means during movement of the drive member from the inoperative position to the operative position for moving the control valve means to the other of the control positions, movable blocking means for alternately blocking movement of the motion transmitting means so that one of the motion transmitting means shifts the control valve means to one of the control positions while the other of the motion transmitting means is blocked, and operating means for moving the blocking means while the drive member is in the inoperative position.

According to a preferred embodiment of the present invention, the blocking means is a plate formed with bores or recesses for the passing of the motion transmitting means, which preferably are push rods, and is operated by electromagnet means.

Preferably the valve control arrangement according to the present invention comprises a single reciprocating drive member for actuating a plurality of valve control means, each valve control means including a control valve, motion transmitting means for shifting the control valve, and blocking means for controlling the operation of the motion transmitting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional view of a valve control means according to the present invention in inoperative position;

Fig. 2 is a sectional view similar to Fig. 1 illustrating one operative position of the valve control means;

Fig. 3 is a sectional view similar to Fig. 1;

Fig. 4 is a sectional view similar to Fig. 1 illustrating another operative position of the valve control means;

Fig. 6 is a sectional view taken on line 6—6 in Fig. 5;

Fig. 7 is a sectional view taken on line 7—7 in Fig. 5; and

Fig. 8 is a sectional view taken on line 8—8 in Fig. 5.

Figure 5:
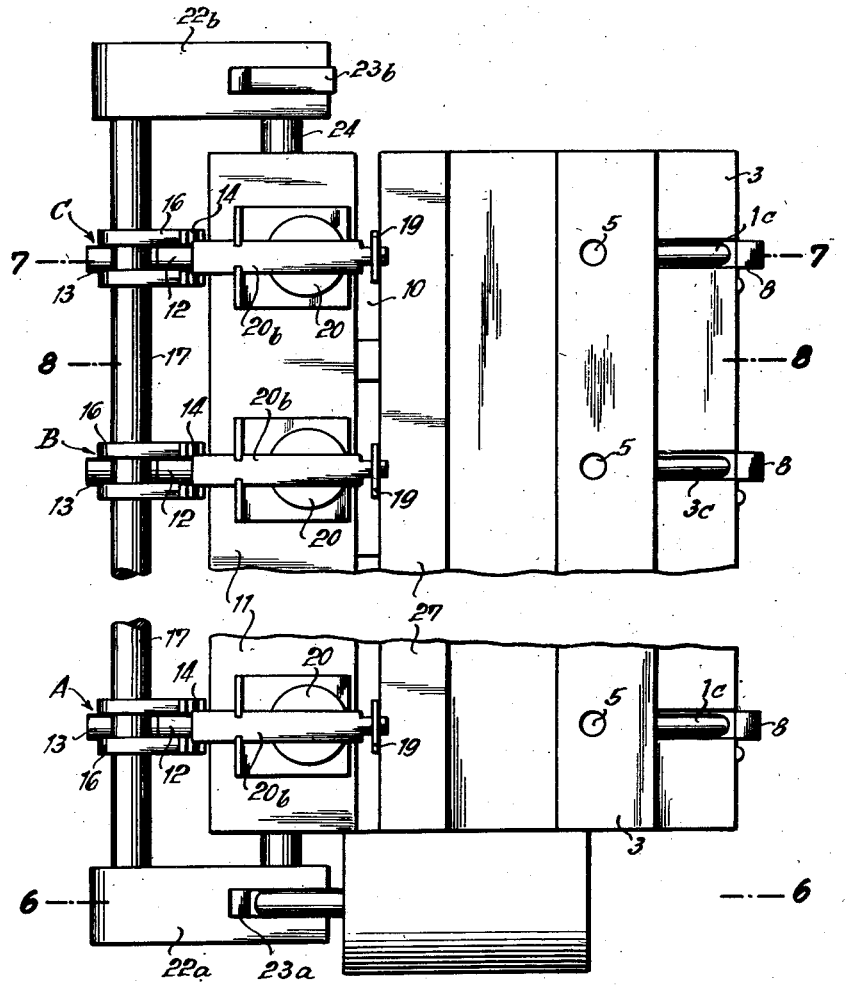
Fig. 5 is a plan view of a preferred embodiment of a valve control arrangement according to the present invention.

Referring now to the drawings, and more particularly to Figs. 1 to 4, a control valve means 1 is mounted slidably in a bore 2 of a member 3. Member 3 is formed with an inlet and an outlet conduit portion 4, 5 which together with the bore 2 form a conduit which is closed and opened, respectively, by the two piston portions 1a and 1b of the control valve 1 which in the position of Fig. 1 permit communication between the inlet and the outlet, while in the position of Fig. 2 the piston 1a separates the inlet and outlet. It will be noted that the liquid pressure acting on the pistons 1a and 1b balances the control valve 1 so that it will remain in any of the two above described control positions.

The conduit member 3 carries supports 3a which have guiding bores 3b. A push rod 6 is slidable in the bores 3b and carries a stop 7 limiting its movement. A double-armed lever 8 is pivotally mounted on the pin 9 on a projection of the member 3, and engages at one end thereof an extension 1c of the control valve 1, and at the other end thereof the push rod 6 so that axial shifting of push rod 6 from the left to the right will effect movement of the control valve 1 from the right to the left, while shifting of the push rod 6 back to the left will have no influence on the control valve 1.

A supporting member 11 is arranged adjacent to, and spaced from member 3 and is formed with two bores 11a and 11b which are aligned with the bores 2 and 3b, respectively, and slidably support two push rods 12 and 13 which are pivotally connected by pins 14, 15 to a double-armed lever 16. The pivot pin 17 of the lever 16 is carried by a reciprocating drive member 18.

A blocking means 19 is arranged in the space 10 between the members 3 and 11 and is suspended on the armature member 20b of an electromagnet 20. The spring 20a urges the pivoted member 20b to raise the blocking member 19 to the upper position shown in Fig. 1. The blocking means 19 is preferably a plate or sheet, and has a bore 21, which in the upper blocking position of the blocking means 19 is staggered with respect to the push rod 12 and in the lower blocking position shown in Fig. 3 registers with the push rod 12. In the upper position of blocking means 19, the push rod 13 is located below the lower edge of blocking member 19.

The device operates as follows:

In the position shown in Fig. 1 the electromagnet 20 is not energized, and the spring 20a raises the blocking plate 19 to an upper blocking position. The drive member 18 is in an inoperative position in which the two push rods 12, 13 are retracted into the support 11. When the drive member is shifted from the inoperative position shown in Fig. 1 to the operative position shown in Fig. 2, the first push rod 12 is blocked by the blocking plate 19 which is still in its first blocking position, so that the first double-armed lever 16 pivots about the pin 14 into a position in which the second push rod 13 engages the third push rod 6, which is shifted and pivots the second double-armed lever 8, so that the control valve 1 is moved to a control position in which the inlet and outlet conduits 4, 5 are separated and the conduits 2, 4, 5 controlled by the valve 1 are closed.

The drive member 18 performs now a return movement into its inoperative position whereby the push rod 13 is retracted. The control valve remains in its position since the shifting means 6, 8 can only be pushed, but not pulled by the motion transmitting member 13. Consequently, the motion transmitting means including the push rod 12, and also the control valve 1 are free of any pressure or tension. The blocking plate 19 is also relieved of the pressure of the motion transmitting means 12 in the inoperative position of the drive member 18 shown in Figs. 1 and 3 and can be shifted into its lower blocking position by electromagnet 20 when the same is energized. In this position, shown in Fig. 3, the bore 21 registers with the push rod 12, while the lower end portion of the blocking plate 19 is located between the push rod 13 and the push rod 6.

The drive member 18 is now moved to its operative position as shown in Fig. 4, and since the push rod 13 is blocked by the blocking member 19, the lever 16 pivots into a position in which the push rod 12 is shifted through the bore 21 and engages the control valve 1, shifting the same to the right into its other control position in which the conduits 2, 4, 5 are opened. The control valve 1 returns during such movement the lever 8 and the push rod 6 to their previous positions so that they are ready for the next operation. When the reciprocating drive member 18 moves now back to its inoperative position shown in Fig. 1 all motion transmitting means, the blocking plate, and the control valve are relieved of any operating pressure, and the blocking plate 19 is shifted back by spring 20a into its upper blocking position when the electromagnet 20 is deenergized.

Referring now to Fig. 5, the valve control arrangement shown in this figure comprises a plurality of valve control means as described with reference to Figs. 1 to 4, which are operated by a single drive member 17' operating levers 16' corresponding to levers 16 of the embodiment of Figs. 1 to 4. In the preferred embodiment shown in Figs. 5 to 8, the drive member 17' is a shaft to which a pair of levers 22a and 22b pivotally are connected. Levers 22a, 22b, together with the guiding means 28, see Figs. 7 and 8, support shaft 17' for reciprocating movement parallel to itself. The ends of levers 22a and 22b are pivoted to supporting levers 23a, 23b which are pivotally mounted on shaft 24 on the support 11.

The shaft 17' is reciprocated by the lever 23a which is turned by servomotor means. As shown in Fig. 6, servo piston 25 urges the lever 23a to turn in clockwise direction and to move the shaft 17' to the left into an inoperative position. A servo piston 26 of greater diameter urges, when actuated, the lever 23a to turn in counter-clockwise direction and to shift the shaft 17' to the right into its operative position. The smaller servo piston 25 is under constant pressure of an operating liquid, while the greater servo piston is only actuated by an operating liquid when a shifting of the drive member 17' into its operative position is required. It is apparent that instead of the servo piston 25, spring means may be provided for returning the drive member 17' to its inoperative position, when the servo piston 26 is relieved of the pressure of the operating liquid.

Fig. 7 corresponds to Fig. 4, and corresponding elements are indicated with the same reference numerals. The inlet conduit portions 4 of the valve control means A, B, C are connected by a conduit 4a extending through the conduit member 3.

Fig. 8 shows the manner in which the support 11 is supported on the conduit member 3. A plate 27 is hooked onto a projection of the member 3, and connected by long rivets 29, 30 to the support 11. Spacing members 31 and 32 are arranged between the members 11 and 27 to provide the space 10 for the passing of the blocking plates 19. Blocking plates 19 are supported on the plate 27 when one of the associated push rods 12 and 13 is blocked by the associated blocking plate 19.

It will be understood that each of the elements described above, or two or more together, may also find a useful application in other types of valve control arrangements differing from the types described above.

While the invention has been illustrated and described as embodied in a valve control arrangement according to which two motion transmitting means shift a control valve and wherein the movement of the motion transmitting means is alternately blocked by a blocking means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A valve control arrangement, comprising, in combination, a conduit member formed with a conduit; a control valve means located in said conduit and being movable between a conduit closing control position and a conduit opening control position; a drive member movable between an operative position and an inoperative position; first motion transmitting means connected to said drive member for movement therewith and tending to engage said control valve means during movement of said drive member from said inoperative position to said operative position for moving said control valve into one of said control positions; second motion transmitting means connected to said drive member for movement therewith and tending to engage said control valve means during movement of said drive member from said inoperative position to said operative position for moving said control valve means to the other of said control positions; movable blocking means for alternately blocking movement of said respective motion transmitting means so that one of said motion transmitting means shifts said control valve means to one of said control positions while the other of said motion transmitting means is blocked; and operating means for moving said blocking means while said drive member is in said inoperative position.

2. A valve control arrangement, comprising, in combination, a conduit member formed with a conduit; a control valve means located in said conduit and being movable between a conduit closing control position and a conduit opening control position; a drive member movable between an operative position and an inoperative position; first motion transmitting means connected to said drive member for movement therewith and tending to engage said control valve means during movement of said drive member from said inoperative position to said operative position for moving said control valve into one of said control positions; second motion transmitting means connected to said drive member for movement therewith and tending to engage said control valve means during movement of said drive member from said inoperative position to said operative position for moving said control valve means to the other of said control positions; blocking means for alternately blocking the movement of said respective motion transmitting means, said blocking means being movable between a first blocking position blocking movement of said first motion transmitting means while said second motion transmitting means is moved by said drive member to engage said control valve means and move the same into one of said control positions, and a second blocking position blocking movement of said second motion transmitting means while said first motion transmitting means is moved by said drive member to engage said control valve means and move the same into the other of said control positions; and operating means for moving said blocking means between said blocking positions while said drive member is in said inoperative position.

3. A valve control arrangement, comprising, in combination, a conduit member formed with a conduit; a control valve means located in said conduit and being movable between a conduit closing control position and a conduit opening control position; a drive member movable between an operative position and an inoperative position; first motion transmitting means connected to said drive member for movement therewith and tending to engage one end of said control valve means during movement of said drive member from said inoperative position to said operative position for moving said control valve into one of said control positions; second motion transmitting means including a motion transmitting member connected to said drive member for movement therewith, and a movable shifting means engaging the other end of said control valve means, said motion transmitting member tending to engage said shifting means during movement of said drive member from said inoperative position to said operative position for moving said shifting means; blocking means movable between a first blocking position blocking movement of said first motion transmitting means while said second motion transmitting means is moved by said drive member to move said control valve means into one of said control positions and a second position blocking movement of said motion transmitting member while said first motion transmitting means is moved by said drive member to engage said control valve means and move the same into the other of said control positions; and operating means for moving said blocking means between said blocking positions while said drive member is in said inoperative position.

4. A valve control arrangement, comprising, in combination, a conduit member formed with a conduit; a control valve means located in said conduit and being movable between a conduit closing control position and a conduit opening control position; a drive member movable between an operative position and an inoperative position; first motion transmitting means connected to said drive member for movement therewith and tending to engage said control valve means during movement of said drive member from said inoperative position to said operative position for moving said control valve into one of said control positions; second motion transmitting means connected to said drive member for movement therewith and tending to engage said control valve means during movement of said drive member from said inoperative position to said operative position for moving said control valve means to the other of said control positions; a blocking means for alternately blocking the movement of said respective motion transmitting means, said blocking means being movable between a first blocking position engaging said first motion transmitting means during movement of said drive member to said operative position while said second motion transmitting means engages said control valve means and moves the same into one of said control positions, and a second blocking position engaging said second motion transmitting means during movement of said drive member to said operative position while said first motion transmitting means engages said control valve means and moves the same into the other of said control positions; and operating means for moving said blocking means between said blocking positions while said drive member is in said inoperative position.

5. A valve control arrangement, comprising, in combination, a conduit member formed with a conduit; a control valve means located in said conduit and being movable between a conduit closing control position and a conduit opening control position; a drive member movable between an operative position and an inoperative position; first motion transmitting means connected to said drive member for movement therewith and tending to engage one end of said control valve means during movement of said drive member from said inoperative position to said operative position for moving said control valve into one of said control positions; second motion transmitting means including a motion transmitting member connected to said drive member for movement therewith, and a movable shifting means engaging the other end of said control valve means, said motion transmitting member tending to engage said shifting means during movement of said drive member from said inoperative position to said operative position for moving said shifting means; blocking means located between said first motion transmitting means and said control valve means, and between said motion transmitting member and said movable shifting means, said blocking means being movable between a first blocking position engaging said first motion transmitting means during movement of said drive member to said operative position for blocking movement of said first motion transmitting means while said second motion transmitting means is moved by said drive member to move said control valve means into one of said control positions and a second position engaging said motion transmitting member and blocking movement of the same while said first motion transmitting means is moved by said drive member to engage said control valve means and move the same into the other of said control positions, said first motion transmitting means and said motion transmitting member being spaced from said blocking means in said inoperative position of said drive member; and operating means for moving said blocking means between said blocking positions while said drive member is in said inoperative position.

6. A valve control arrangement, comprising, in combination, a conduit member formed with a conduit; a control valve means located in said conduit and being movable between a conduit closing control position and a conduit opening control position; a drive member movable reciprocable in one direction between an operative position and an inoperative position; first motion transmitting means connected to said drive member for movement therewith and tending to engage one end of said control valve means during movement of said drive member from said inoperative position to said operative position for moving said control valve into one of said control positions; second motion transmitting means movable in said direction and including a motion transmitting member movable in said direction and connected to said drive member for movement therewith, and a movable shifting means engaging the other end of said control valve means, said motion transmitting member tending to engage said shifting means during movement of said drive member from said inoperative position to said operative position for moving said shifting means; blocking means located between said first motion transmitting means and said control valve means, and between said motion transmitting member and said movable shifting means, said blocking means being movable in a direction transverse to the direction of reciprocation of said drive member, of said first motion transmitting means and of said motion transmitting member between a first blocking position engaging said first motion transmitting means during movement of said drive member to said operative position for blocking movement of said first motion transmitting means while said second motion transmitting means is moved by said drive member to move said control valve means into one of said control positions and a second position engaging said motion transmitting member and blocking movement of the same while said first motion transmitting means is moved by said drive member to engage said control valve means and move the same into the other of said control positions, said first motion transmitting means and said motion transmitting member being spaced from said blocking means in said inoperative position of said drive member; and operating means for moving said blocking means between said blocking positions while said drive member is in said inoperative position.

7. A valve control arrangement, comprising, in combination, a conduit member formed with a conduit; an elongated control valve means located in said conduit and being movable between a conduit opening control position and a conduit closing control position; a reciprocating drive member movable between an operative position and an inoperative position; a first double-armed lever pivotally mounted intermediate the ends thereof on said drive member; a first support; a pair of push rods pivotally connected to the ends of said double-armed lever, one of said push rods being guided in said first support aligned with said control valve means and tending to engage one end of the same during movement of said drive member to said operative position, the other of said push rods being guided in said first support for movement parallel to said first push rod; a second support; a second double-armed lever pivotally mounted intermediate the ends thereof on said second support and engaging with one arm thereof the other end of said control valve means; a third push rod mounted in said second support aligned with said second push rod and engaging at one end thereof the other arm of said second lever; a blocking member located intermediate said first and second push rods, and between said control valve means and said third push rod, said blocking member being movable in a direction transverse to the direction of movement of said push rods between a first blocking position and a second blocking position, and being formed with a recess permitting in said first blocking position passing of said first push rod into engagement with said control valve means for moving the same into one of said control positions while said second push rod is engaged and blocked by said blocking member so that said first lever is pivoted during movement of said drive member into said operative position, said blocking member blocking in said second position movement of said first push rod so that said first lever is pivoted and said second push rod shifts said third push rod and said second lever for moving said control valve means into the other of said control positions; and operating means for moving said blocking member between said blocking positions while said drive member is in said inoperative position.

8. A valve control arrangement as claimed in claim 7 wherein said first and second push rods are spaced from said blocking member when said drive member is in said inoperative position.

9. A valve control arrangement as claimed in claim 7 wherein said blocking member is a plate extending transverse to said push rods, and wherein said recess is a bore passing through said plate.

10. A valve control arrangement, comprising, in combination, a conduit member formed with a conduit; an elongated control valve means located in said conduit and being movable between a conduit opening control position and a conduit closing control position; a reciprocating drive member movable between an operative position and an inoperative position; a first double-armed lever pivotally mounted intermediate the ends thereof on said drive member; a first support; a pair of push rods pivotally connected to the ends of said double-armed lever, one of said push rods being guided in said first support aligned with said control valve means and tending to engage one end of the same during movement of said drive member to said operative position, the other of said push rods being guided in said first support for movement parallel to said first push rod; a second support; a second double-armed lever pivotally mounted intermediate the ends thereof on said second support and engaging with one arm thereof the other end of said control valve means; a third push rod mounted in said second support aligned with said second push rod and engaging at one end thereof the other arm of said second lever; a blocking member located intermediate said first and second push rods, and between said control valve means and said third push rod, said blocking member being movable in a direction transverse to the direction of movement of said push rods between a first blocking position and a second blocking position, and being formed with a recess permitting in said first blocking position passing of said first push rod into engagement with said control valve means for moving the same into one of said control positions while said second push rod is engaged and blocked by said blocking member so that said first lever is pivoted during movement of said drive member into said operative position, said blocking member blocking in said second position movement of said first push rod so that said first lever is pivoted and said second push rod shifts said third push rod and said second lever for moving said control valve means into the other of said control positions; and electromagnet means for moving said blocking member between said blocking positions while said drive member is in said inoperative position.

11. A valve control arrangement as claimed in claim 2 and including drive means for reciprocating said drive member, said drive means including hydraulic servomotor means including at least one reciprocating member, and means connecting said reciprocating member with said drive member.

12. A valve control arrangement as claimed in claim 2 and including drive means for reciprocating said drive member, said drive means including at least one pivoted lever connected at one end thereof to said drive member and being turnable in opposite directions for moving said drive member into said operative position during turning in one direction and moving said drive member to said inoperative position during turning in the opposite direction, a first hydraulically operated servo piston means engaging said pivoted lever for turning the same in said one direction, and a second hydraulically operated servo piston means engaging said pivoted lever for turning the same in the opposite direction, said second hydraulically operated servo piston means having a smaller diameter than said first servo piston so that said second servo piston is only effective when said first servo piston is not actuated.

13. A valve control arrangement as claimed in claim 7 and including drive means for reciprocating said drive member, said drive means including at least one pivoted lever connected at one end thereof to said drive member and being turnable in opposite directions for moving said drive member into said operative position during turning in one direction and moving said drive member to said inoperative position during turning in the opposite direction, a first hydraulically operated servo piston means engaging said pivoted lever for turning the same in said one direction, and a second hydraulically operated servo piston means engaging said pivoted lever for turning the same in the opposite direction, said second hydraulically operated servo piston means having a smaller diameter than said first servo piston so that said second servo piston is only effective when said first servo piston is not actuated.

14. A valve control arrangement, comprising, in combination, a drive member movable between an operative position and an inoperative position; a conduit member formed with a plurality of conduits; and a plurality of valve control means, each of said valve control means being located in one of said conduits and movable between conduit closing control position and a conduit opening control position, first motion transmitting means connected to said drive member for movement therewith and tending to engage said control valve means during movement of said drive member from said inoperative position to said operative position for moving said control valve means into one of said control positions, second motion transmitting means connected to said drive member for movement therewith and tending to engage said control valve means during movement of said drive member from said inoperative position to said operative position for moving said control valve means to the other of said control positions, blocking means for alternately blocking the movement of said respective motion transmitting means, said blocking means being movable between a first blocking position blocking movement of said first motion transmitting means while said second motion transmitting means is moved by said drive member to engage said control valve means and move the same into one of said control positions, and a second blocking position blocking movement of said second motion transmitting means while said first motion transmitting means is moved by said drive member to engage said control valve means and move the same into the other of said control positions, and operating means for moving said blocking means between said blocking positions while said drive member is in said inoperative position.

15. A valve control arrangement, comprising, in combination, a drive member movable between an operative position and an inoperative position; a conduit member formed with a plurality of conduits; and a plurality of valve control means, each of said valve control means being located in one of said conduits and movable between a conduit closing control position and a conduit opening control position; a first double-armed lever pivotally mounted intermediate the ends thereof on said drive member; a first support; a pair of push rods pivotally connected to the ends of said double-armed lever, one of said push rods being guided in said first support aligned with said control valve means and tending to engage one end of the same during movement of said drive member to said operative position, the other of said push rods being guided in said first support for movement parallel to said first push rod; a second support; a second double-armed lever pivotally mounted intermediate the ends thereof on said second support and engaging with one arm thereof the other end of said control valve means; a third push rod mounted in said second support aligned with said second push rod and engaging at one end thereof the other arm of said second lever; a blocking member located intermediate said first and second push rods, and between said control valve means and said third push rod, said blocking member being movable in a direction transverse to the direction of movement of said push rods between a first blocking position and a second blocking position, and being formed with a recess permitting in said first blocking position passing of said first push rod into engagement with said control valve means for moving the same into one of said control positions while said second push rod is engaged and blocked by said blocking member so that said first lever is pivoted during movement of said drive member into said operative position, said blocking member blocking in said second position movement of said first push rod so that said first lever is pivoted and said second push rod shifts said third push rod and said second lever for moving said control valve means into the other of said control positions; and electromagnet means for moving said blocking means between said blocking positions while said drive member is in said inoperative position.

16. A valve control arrangement as claimed in claim 15 and including drive means for reciprocating said drive member, said drive means including at least one pivoted lever connected at one end thereof to said drive member and being turnable in opposite directions for moving said drive member into said operative position during turning in one direction and moving said drive member to said inoperative position during turning in the opposite direction, a first hydraulically operated servo piston means engaging said pivoted lever for turning the same in said one direction, and a second hydraulically operated servo piston means engaging said pivoted lever for turning the same in the opposite direction, said second hydraulically operated servo piston means having a smaller diameter than said first servo piston so that said second servo piston is only effective when said first servo piston is not actuated.

References Cited in the file of this patent

UNITED STATES PATENTS

| | | |
|---|---|---|
| 2,333,060 | Turner | Oct. 26, 1943 |
| 2,343,495 | Campbell | Mar. 7, 1944 |
| 2,503,469 | Caldwell | Apr. 11, 1950 |